US011039076B2

(12) United States Patent
Koga (10) Patent No.: US 11,039,076 B2
(45) Date of Patent: Jun. 15, 2021

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Hironobu Koga, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 45 days.

(21) Appl. No.: 15/918,009

(22) Filed: Mar. 12, 2018

(65) Prior Publication Data

US 2018/0262666 A1   Sep. 13, 2018

(30) Foreign Application Priority Data

Mar. 13, 2017 (JP) .............................. JP2017-047327

(51) Int. Cl.
*H04N 7/18* (2006.01)
*H04N 5/235* (2006.01)
(Continued)

(52) U.S. Cl.
CPC .......... *H04N 5/2351* (2013.01); *G01J 1/4204* (2013.01); *G01J 3/0297* (2013.01);
(Continued)

(58) Field of Classification Search
CPC .... B60L 2200/26; B60L 55/00; G01J 1/4204; G01J 2001/4266; G01J 2003/2869; G01J 2003/425; G01J 3/0297; G01J 3/42; H02P 9/42; H02P 9/48; H04N 5/2351; H04N 5/243
(Continued)

(56) References Cited

U.S. PATENT DOCUMENTS 4,119,362 A * 10/1978 Holzman ................. G02B 6/32
385/73
4,989,948 A *  2/1991 Dreyer, Jr. ............ F21V 7/0008
359/515
(Continued)

FOREIGN PATENT DOCUMENTS

JP   H09280815 A   10/1997
JP   2006127539 A   5/2006
(Continued)

OTHER PUBLICATIONS

Y. Manabe et al., Estimation of illuminant spectral distribution with geometrical information from spectral image, 2000, IEEE, vol. 2, pp. 1-3.*

(Continued)

*Primary Examiner* — Gims S Philippe
(74) *Attorney, Agent, or Firm* — Rossi, Kimms & McDowell LLP (57) ABSTRACT

An information processing method includes the steps of calculating information on object illumination light for illuminating an object based on spatial distribution information of illumination light and orientation information of the object, and correcting information on the reflected light so as to reduce influence of the object illumination light based on the information on the object illumination light and information on the reflected light from the object.

19 Claims, 7 Drawing Sheets

(51) Int. Cl.
*H04N 5/243* (2006.01)
*G06T 7/73* (2017.01)
*G01J 3/02* (2006.01)
*G01J 3/42* (2006.01)
*G01J 1/42* (2006.01)
*G01J 3/28* (2006.01)

(52) U.S. Cl.
CPC .............. *G01J 3/42* (2013.01); *G06T 7/73* (2017.01); *H04N 5/243* (2013.01); *G01J 2001/4266* (2013.01); *G01J 2003/2869* (2013.01); *G01J 2003/425* (2013.01)

(58) Field of Classification Search
USPC ................................................ 348/135, 143
See application file for complete search history.

(56) References Cited

U.S. PATENT DOCUMENTS

| | | | | |
|---|---|---|---|---|
| 4,989,984 A * | 2/1991 | Salinger | ............... | G01B 11/303 |
| | | | | 250/559.23 |
| 7,652,772 B2 * | 1/2010 | Backman | ................. | G01J 3/02 |
| | | | | 356/497 |
| 9,459,820 B2 * | 10/2016 | Yoshida | ............... | G06T 15/506 |
| 9,530,188 B2 | 12/2016 | Kaneko | | |
| 2009/0323040 A1 * | 12/2009 | Cornell | ............... | G03F 7/70191 |
| | | | | 355/67 |
| 2010/0259746 A1 * | 10/2010 | Ohnishi | ................. | G01B 11/24 |
| | | | | 356/4.01 |
| 2011/0176029 A1 * | 7/2011 | Boydston | ................. | G01J 3/50 |
| | | | | 348/223.1 |
| 2015/0131090 A1 * | 5/2015 | Osumi | .................... | G01J 3/504 |
| | | | | 356/300 |
| 2016/0224861 A1 * | 8/2016 | Vogh, Jr. | ............... | G06K 9/4652 |
| 2017/0205291 A1 * | 7/2017 | Shimada | .................. | G01J 9/00 |
| 2017/0309035 A1 * | 10/2017 | Koda | ...................... | G06T 7/586 |
| 2018/0199017 A1 * | 7/2018 | Michaelis | ............. | G03B 21/13 |
| 2018/0352163 A1 * | 12/2018 | Ando | ..................... | H04N 5/232 |

FOREIGN PATENT DOCUMENTS

| | | |
|---|---|---|
| JP | 5950117 B2 | 7/2016 |
| JP | 2017161370 A | 9/2017 |
| WO | 2010087162 A1 | 8/2010 |
| WO | 2013190772 A1 | 12/2013 |

OTHER PUBLICATIONS

Office Action issued in Japanese Appln. No. 2017-047327 dated Apr. 20, 2021. English translation provided.

Okura "Estimation of Diffusion Reflectance of Outdoor Objects by Simultaneous Image Capturing of Light Source Environment and Object and Its Evaluation." Journal of Information Processing Society of Japan. Apr. 2009: pp. 32-41. vol. 2, No. 1. English abstract provided.

* cited by examiner

INFORMATION PROCESSING APPARATUS, INFORMATION PROCESSING METHOD, AND STORAGE MEDIUM

BACKGROUND OF THE INVENTION

Field of the Invention

The present invention relates to an information processing apparatus that corrects information on reflected light from an object according to illumination light.

Description of the Related Art

Reflected light from an object is derived from illumination light that has been reflected and scattered on the object surface. Thus, even for two objects have the identical reflection/scattering characteristic, the reflected light changes when the illumination light is different. Since the reflected light changes as the illumination light changes, it is difficult to accurately obtain the reflection/scattering characteristic of the object. This poses an important issue in remote sensing using a multi-band image and a hyper spectral image. In order to solve this problem, it is necessary to estimate the illumination light and to reduce the influence.

Japanese Patent No. (JP) 5,950,117 discloses, as an illumination light estimating method, a method for combining a direct light component and a scattering light component of natural light with each other using a weight coefficient determined based on weather information in image pickup.

The method disclosed in JP 5,950,117 can estimate illumination light under an image pickup environment, such as fine weathers, cloudy weathers, and shades, based on the cloudy degree as weather information and shielding/non-shielding of a direct light component by an object. However, the cloud density depends on the cloud degree and the illumination light changes due to whether or not the cloud shields the sun even with the same cloud amount. Thus, the method disclosed in JP 5,950,117 has difficulties in accurately estimating the illumination light.

An object is illuminated by light from each direction in the sky in the outdoor photography, but each illumination is different according to the orientation of the object. However, the method disclosed in JP 5,950,117 has difficulties in estimating the illumination light according to the orientation of the object.

SUMMARY OF THE INVENTION

The present invention provides an information processing method and an information processing apparatus, which can accurately acquire a characteristic of an object.

An information processing method according to one aspect of the present invention includes the steps of calculating information on object illumination light for illuminating an object based on spatial distribution information of illumination light and orientation information of the object, and correcting information on the reflected light so as to reduce influence of the object illumination light based on the information on the object illumination light and information on the reflected light from the object. A computer-readable non-transitory storage medium storing a program that enables the above information processing method also constitutes one aspect of the present invention.

An information processing apparatus according to another aspect of the present invention includes an illumination information inputter configured to input spatial distribution information of illumination light, an object orientation information inputter configured to input orientation information of an object, an object illumination light calculator configured to calculate information on object illumination light for illuminating the object based on the spatial distribution information of the illumination light and the orientation information of the object, a reflected light information inputter configured to input information on reflected light on the object, and a reflected light corrector configured to correct information on the reflected light so as to reduce influence of the illumination light based on information on the object illumination light and information on the reflected light from the object.

Further features of the present invention will become apparent from the following description of exemplary embodiments with reference to the attached drawings.

DESCRIPTION OF THE EMBODIMENTS

A detailed description will be given of embodiments of the present invention with reference to the accompanying drawings. An information processing method according to the embodiments includes calculating or acquiring processing of information on object illumination light based on spatial distribution information of illumination light and orientation information of an object, and correcting processing of information on reflected light based on information on the object illumination light and information on the reflected light from the object. A detailed description of each processing will be given below.

(Calculating Method of Object Illumination Light)

Figure 7:
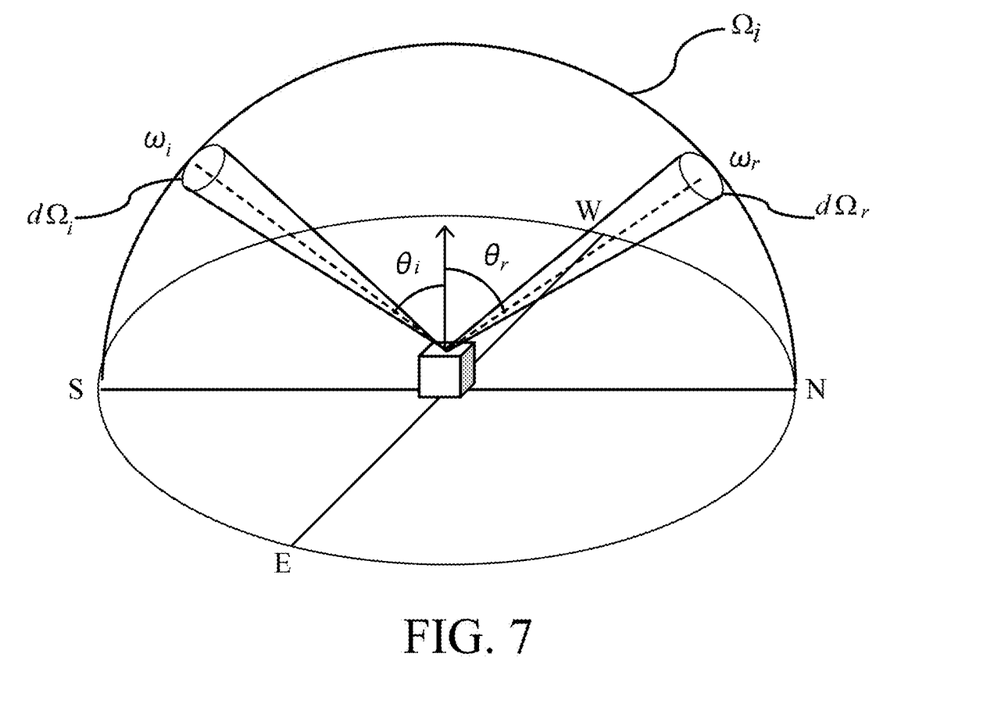
FIG. 7 illustrates a model of the illumination light reflected on an object according to each embodiment.

Referring now to FIG. 7, a description will be given of a calculating method of object illumination light for illuminating the object. FIG. 7 illustrates a reflection model of the illumination light on the object.

Where both the spatial distribution information of the illuminated light and the orientation information of the object under the illumination light are known, object illumination light $E_i(\lambda)$ for illuminating the object is calculated as in the following expression (1).

$$E_i(\lambda) = \int_{\Omega_i} B_i(\lambda, \omega_i) \cos \theta_i d\Omega_i \qquad (1)$$

In the expression (1), $\Omega_i$ is a hemisphere space in which the object is placed, $d\Omega_i$ is an infinitesimal or differential solid angle in the hemisphere space $\Omega_i$. $B_i(\lambda, \Omega_i)$ is a radiance of light that reaches the object from the infinitesimal solid angle $d\Omega_i$ in a direction with an angle $\omega_i$ of illumination light entering the object, $\theta_i$ is an angle between a center axis of the reflected light from the object and a surface normal of the object. That the spatial distribution information of the illumination line is known means that the radiance $B_i(\lambda, \omega_i)$ is known. That the orientation information of the object is known means that the angle $\theta_i$ is known. Thus, the object illumination light $E_i(\lambda)$ (information on the object illumination light) can be calculated in accordance with the orientation of the object based on the spatial distribution information of the illumination light and orientation information of the object.

(Correcting Method of Influence by the Object Illumination Light)

The reflected light $R(\lambda)$ from the object illuminated by the object illumination light $E_i(\lambda)$ is expressed as in the expression (2).

$$R(\lambda) = \int_{\Omega_i} BRDF(\omega_i \to \omega_r) B_i(\lambda, \omega_i) \cos\theta_r d\Omega_r \cos\theta_i d\Omega_i \quad (2)$$

In the expression (2), $BRDF(\omega_i \to \omega_r)$ is a bi-lateral reflectance distribution function as a ratio of a luminance of light entering the object from a direction with the angle $\omega_i$ to the luminance of the reflected/scattering light on the object in the direction with the angle $\omega_r$. In addition, $d\Omega_r$ is an infinitesimal or differential solid angle of the measured reflected/scattering light, and $\theta_r$ is an angle between the angle $\omega_r$ (angular information of the reflected light from the object) and the surface normal of the object.

As expressed in the expression (2), the reflected light $R(\lambda)$ is subject to the radiance $B_i(\lambda, \omega_i)$ or the object illumination light $E_i(\lambda)$. Thus, so as to make a correction for reducing the influence of the object illumination light $E_i(\lambda)$ and to calculate the reflectance of the object itself, it is necessary to divide the reflected light $R(\lambda)$ expressed by the expression (2) by the object illumination light $E_i(\lambda)$. Where $S(\lambda)$ is a true reflectance (or reflection) characteristic of the object in which the influence of the object illumination light $E_i(\lambda)$ is corrected, the reflectance characteristic (reflection characteristic) $S(\lambda)$ is calculated as in the following expression (3).

$$S(\lambda) = \frac{R(\lambda)}{\int_{\Omega_i} BRDF_{ideal}(\omega_i \to \omega_r) B_i(\lambda, \omega_i) \cos\theta_r d\Omega_r \cos\theta_i d\Omega_i} \quad (3)$$

In the expression (3), $BRDF_{ideal}(\omega_i \to \omega_r)$ is a bi-lateral reflectance distribution function of an ideal object in which a shape of an angular characteristic shape of the reflected/scattering characteristic is equal to $BRDF(\omega_i \to \omega_r)$ and the reflectance is 1. Since $BRDF(\omega_i \to \omega_r)$ of the object is usually unknown, it is difficult to calculate $BRDF_{ideal}(\omega_i \to \omega_r)$. However, where the object has a perfectly diffusing surface, $BRDF_{ideal}(\omega_i \to \omega_r) = 1/\hbar$ and thus the expression (3) can be expressed as follows.

$$S(\lambda) = \frac{\pi R(\lambda)}{\int_{\Omega_i} B_i(\lambda, \omega_i) \cos\theta_r d\Omega_r \cos\theta_i d\Omega_i} = \frac{\pi R(\lambda)}{E_i(\lambda) \cos\theta_r d\Omega_r} \quad (3)$$

This configuration can calculate the reflectance characteristic $S(\lambda)$ (information on the true reflected light from the object) corrected so as to reduce the influence of the object illumination light $E_i(\lambda)$ using the object illumination light $E_i(\lambda)$ and the angle $\theta_r$ (orientation information of the reflected light).

When a multi-band camera obtains the reflected light from the object, the reflectance characteristic (reflection characteristic) of the object can be calculated in which the influence of the object illumination light is corrected as follows. Initially, each band luminance value $I_k$ of the multi-band camera having n bands can be expressed as follows.

$$I_k = C \int_{\lambda_{k1}}^{\lambda_{k2}} R(\lambda) L(\lambda) \phi_k(\lambda) d\lambda \quad (5)$$

In the expression (5), C is a proportionality constant, $R(\lambda)$ is reflected light expressed by the expression (2), and $L(\lambda)$ is a spectral transmittance of an optical system used for image pickup. In addition, $\varphi_k$ (k=1, 2, ..., n) is a k-th band spectral sensitivity characteristic in the multi-band camera used for image pickup. $\lambda_{k1}$ and $\lambda_{k2}$ (k=1, 2, ..., n) are a minimum wavelength and a maximum wavelength of the spectral sensitivity characteristic of the k-th band in the multi-band camera.

The reflected light $R(\lambda)$ in the expression (5) is subject to the radiance $B_i(\lambda, \omega_i)$ by the expression (2). At this time, Sk, as the reflectance characteristic (reflection characteristic) of the object in which the influence of the illumination light is corrected, is expressed as follows.

$$S_k = \frac{\pi I_k}{C \cos\theta_r d\Omega_r \int_{\lambda_{k1}}^{\lambda_{k2}} E_i(\lambda) L(\lambda) \phi_k(\lambda) d\lambda} \quad (6)$$

The expression (6) assumes that the object has a perfectly diffusing surface, similar to the expression (4). Using the expression (6), the reflectance characteristic $S_k$ of the object in which the influence of the object illumination light is corrected. Due to the expressions (4) and (6), the absolute reflectance of the object can be obtained based on the reflected light from the object obtained under the illumination light ($E_i(\lambda)$).

On the other hand, the reflected light ($R(\lambda)$, $I_k$) of the object obtained under the illumination light ($E_i(\lambda)$) is converted as follows into the reflected light ($R'(\lambda)$, $I'_k$) of the object obtained under other illumination light ($E'_i(\lambda)$).

$$R'(\lambda) = \frac{E'_i(\lambda)}{E_i(\lambda)} R(\lambda) \quad (7)$$

$$I'_k = \frac{\int_{\lambda_{k1}}^{\lambda_{k2}} E'_i(\lambda) L(\lambda) \phi_k(\lambda) d\lambda}{\int_{\lambda_{k1}}^{\lambda_{k2}} E_i(\lambda) L(\lambda) \phi_k(\lambda) d\lambda} I_k \quad (8)$$

In this case, the orientation information of the reflected light (angle $\theta_r$) may not be used.

(Acquiring Method of Spatial Distribution Information of the Illumination Light)

Next follows a description of an acquiring method of spatial distribution information of the illumination light. Herein, a description will be given of the acquiring method of the spatial distribution information of the illumination light based on a half celestial sphere image in the sky.

Initially, as a precondition, natural light $B(\lambda)$ is approximated as follows.

$$B(\lambda) = F(\lambda) T(\lambda) [a_0 + a_1(\lambda/\lambda_0)^{-1} + a_2(\lambda/\lambda_0)^{-4}] \quad (9)$$

In the expression (9), $F(\lambda)$ is an extra terrestrial radiation spectrum, $T(\lambda)$ is an transmissivity, $\lambda$ is a wavelength, and $\lambda_0$ is a reference wavelength. In addition, $a_0$ is a coefficient representing a direct light component, $a_1$ is a coefficient representing a Rayleigh scattering component, and $a_2$ is a coefficient representing a Mie scattering component by atmospheric aerosol particles. Since $F(\lambda)$ and $T(\lambda)$ can use prior observation results, the natural light $B(\lambda)$ is determined by the three variables of $a_0$, $a_1$, and $a_2$. The natural light $B(\lambda)$ changes according to the sun position, the weather condition, the atmospheric state, etc., but the influenced natural light $B(\lambda)$ can be expressed by changing the values of the coefficients $a_0$, $a_1$, and $a_2$.

Next follows a description of a method for acquiring the spatial distribution information of the illumination light based on the half celestial sphere image of the sky. While this embodiment exemplarily uses the three-band or RGB-band image, the present invention is not limited to this embodiment and is applicable to a multi-band image having at least three bands. The RGB values when the sky is imaged are expressed as follows.

$$R = C\int_{\lambda_{R1}}^{\lambda_{R2}} B(\lambda) L(\lambda) \varphi_R(\lambda) d\lambda$$

$$G = C\int_{\lambda_{G1}}^{\lambda_{G2}} B(\lambda) L(\lambda) \varphi_G(\lambda) d\lambda$$

$$B = C\int_{\lambda_{B1}}^{\lambda_{B2}} B(\lambda) L(\lambda) \varphi_B(\lambda) d\lambda \quad (10)$$

In the expression (10), $L(\lambda)$ is a spectral transmittance of an optical system used for image pickup, $\varphi_k$ (k=R, G, B) is a spectral sensitivity characteristic of a camera used for image pickup, and $\lambda_{k1}$ and $\lambda_{k2}$ (k=R, G, B) are a minimum wavelength and a maximum wavelength of the spectral sensitivity characteristic of the camera. In addition, C is a proportionality constant.

When the expression (9) is substituted for the expression (10), the following expression (11) can be obtained. $I_0^k$, $I_1^k$, $I_2^k$ in the expression (11) can be expressed as in the expression (12). In addition, $b_0$, $b_1$, $b_2$ are defined as in the expression (13).

$$R = b_0 I_0^R + b_1 I_1^R + b_2 I_2^R$$

$$G = b_0 I_0^G + b_1 I_1^G + b_2 I_2^G$$

$$B = b_0 I_0^B + b_1 I_1^B + b_2 I_2^B \quad (11)$$

$$I_0^k = \int_{\lambda_{k1}}^{\lambda_{k2}} F(\lambda) T(\lambda) L(\lambda) \varphi_k(\lambda) d\lambda$$

$$I_1^k = \int_{\lambda_{k1}}^{\lambda_{k2}} F(\lambda) T(\lambda) (\lambda/\lambda_0)^{-1} L(\lambda) \varphi_k(\lambda) d\lambda$$

$$I_2^k = \int_{\lambda_{k1}}^{\lambda_{k2}} F(\lambda) T(\lambda) (\lambda/\lambda_0)^{-4} L(\lambda) \varphi_k(\lambda) d\lambda \quad (12)$$

$$b_0 = C a_0$$

$$b_1 = C a_1$$

$$b_2 = C a_2 \quad (13)$$

The value of the expression (12) can be previously calculated. Hence, the coefficients $a_0$, $a_1$, and $a_2$ can be calculated by the following expression (14) with the RGB values.

$$\begin{bmatrix} a_0 \\ a_1 \\ a_2 \end{bmatrix} = \frac{1}{C} \begin{bmatrix} I_0^R & I_1^R & I_2^R \\ I_0^G & I_1^G & I_2^G \\ I_0^B & I_1^B & I_2^B \end{bmatrix}^{-1} \begin{bmatrix} R \\ G \\ B \end{bmatrix} \quad (14)$$

Thus, the illumination light can be obtained based on the specific area in the sky by substituting the calculated coefficients $a_0$, $a_1$, and $a_2$ for the expression (9). The coefficients $a_0$, $a_1$, and $a_2$ can be calculated for each point in the image based on the half celestial sphere image in the sky. Hence, the spatial distribution information of the illumination light can be obtained based on the half celestial sphere image in the sky.

This embodiment uses the three-band image, but the present invention is not limited to this embodiment as long as the number of bands is equal to or larger than the number of variables in the natural light approximation model. For example, a four-band image can be used and the variables may be calculated by the least square method etc. instead of the expression (14). While this embodiment uses the RGB images, but the present invention is not limited to the RGB bands as long as the number of stages in the inverse matrix as illustrated in the expression (14) is equal to or larger than the number of variables in the natural light approximation model. For example, instead of the visible range red wavelength band R, the near infrared wavelength band IR may be used. In addition, the natural light calculated by the approximation model in the expression (9) is not limited to the visible wavelength band and this embodiment can utilize a range from the ultraviolet ray (300 nm) to the near infrared region (2.5 μm). In addition, the approximation model other than the expression (9) may be used.

(Acquiring Method of the Orientation Information of the Object)

The orientation information of the object in this embodiment corresponds to any one of a surface normal vector of the object, an azimuth angle and an elevation angle of the object plane, or slopes of the object plane in two direction, but the present invention is not limited to this embodiment. The orientation information of the object can be manually input by the user. In addition, the surface normal vector of the object etc. can be calculated based on the three-dimensional measurement information. The three-dimensional measurement information can be acquired by a stereo method, an active stereo method, a light laser method, etc.

When a target object includes a plurality of objects, one of a plurality of objects (a plurality of local objects) may be considered to be one object and the orientation information of the object may be calculated. For example, in a rice paddy field, a plurality of rice crops may be regarded as one object and the orientation information of the object may be calculated. Moreover, when the object has a surface structure, the orientation information of the object may be calculated by averaging the orientation information of the surface structures (local orientation information).

A description will now be given of a variety of embodiments of the present invention.

First Embodiment

Figure 1:
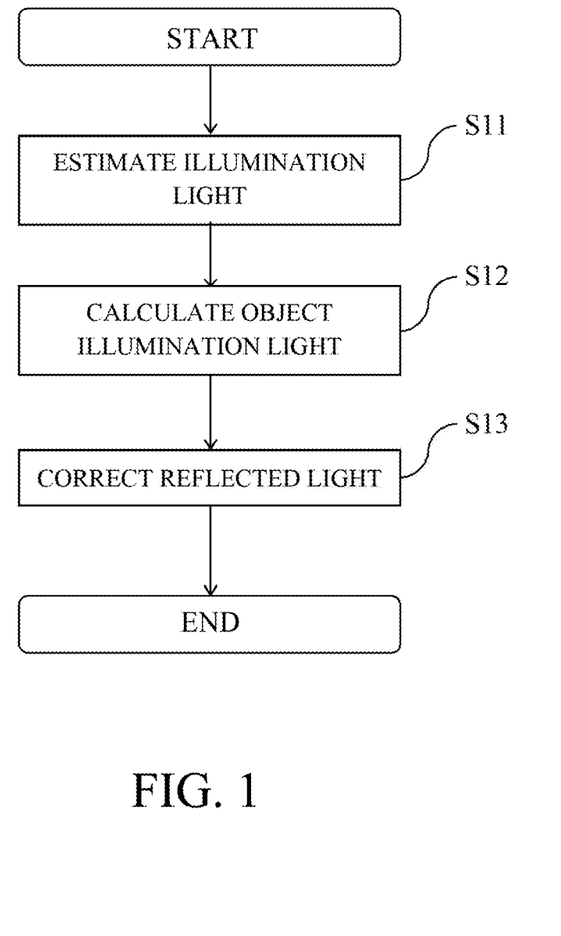
FIG. 1 is a flowchart of an information processing method according to a first embodiment.
Figure 2:
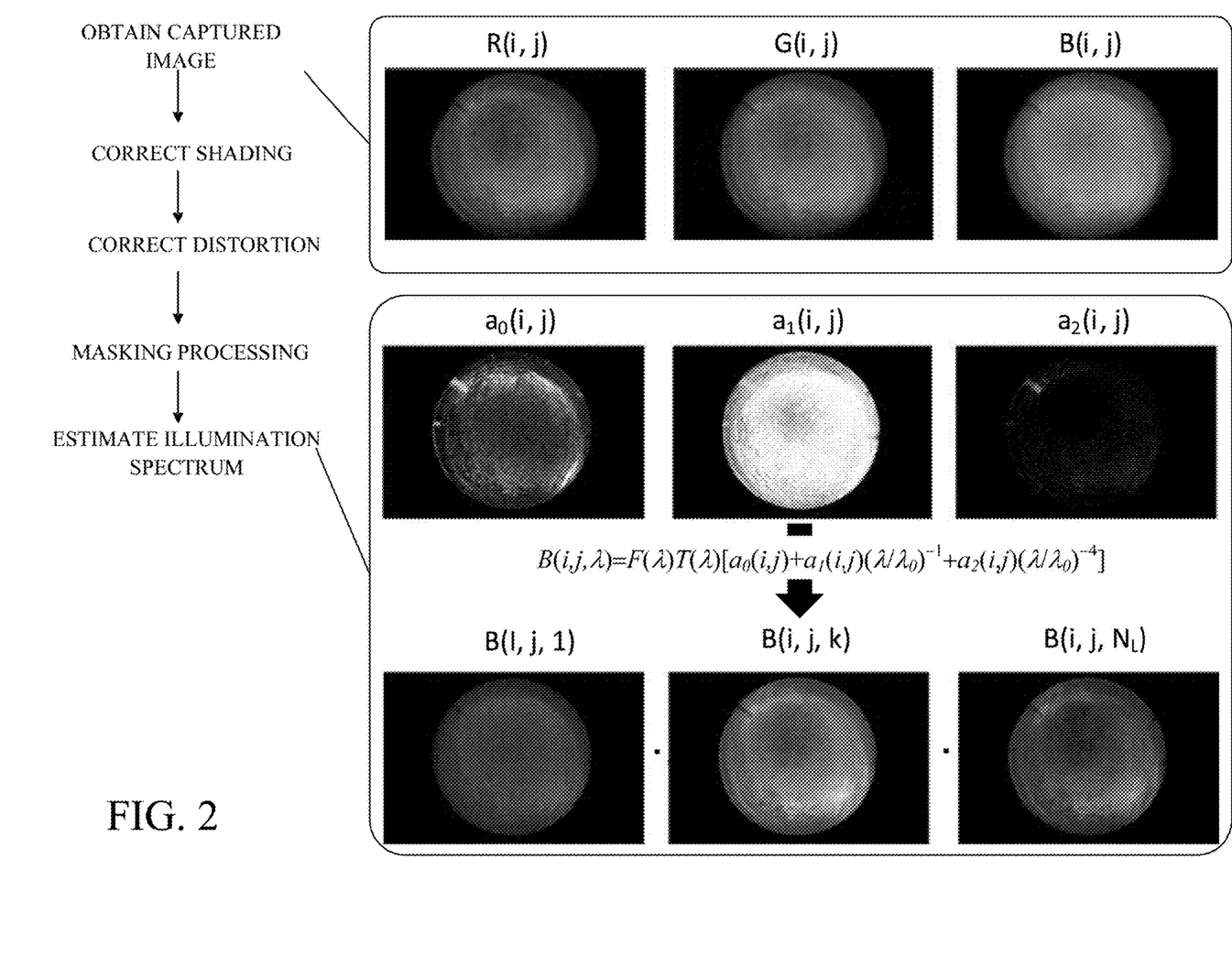
FIG. 2 is an explanatory view of an illumination light estimating method according to the first embodiment.

Referring now to FIGS. 1 to 3D, a description will be given of an information processing method according to an embodiment of the present invention. FIG. 1 is a flowchart of an information processing method according to this embodiment. Each step in FIG. is executed, for example, by an information processing apparatus (measurement system) according to a third or fourth embodiment. FIG. 2 is an explanatory view of an illumination light estimating method at the step S11 in FIG. 1. FIGS. 3A to 3D are explanatory views of an object illumination light calculating method at the step S12 in FIG. 1.

At the step S11 in FIG. 1, the information processing apparatus estimates spatial distribution information of illumination light. At the step S11, the information processing apparatus estimates the spatial distribution information of the illumination light using a circular fisheye image having a whole angle of view of 180 degrees (image captured with a fisheye lens). Using the circular fisheye image having a whole angle of view equal to or higher than 180 degrees, the spatial distribution information of each illumination light entering the object from each point in the sky can be acquired. This embodiment uses, but is not limited to, the RGB images.

The top in FIG. 2 illustrates a circular fisheye image (captured image) in the sky. This embodiment uses the RGB three-band image, and R(i, j), G(i, j), and B(i, j) represent an R-band image, a G-band image and a B-band image, respectively. Herein, i and j represent pixel numbers in the horizontal direction and in the vertical direction, and the number of pixels $N_h$ and $N_v$ in the horizontal direction and in vertical direction satisfy $1 \leq i \leq N_h$ and $1 \leq j \leq N_v$.

In accurately estimating the illumination light, this embodiment may use image data having a photoelectrically converted value obtained by an image sensor having a linear sensitivity characteristic to incident light. When the sky that contains the sun is captured in the fine weather, a photoelectrically converted value saturates and an output value loses linearity to the incident light but a so-called high dynamic range image may be used in which a plurality of images captured by changing the exposure are combined. When the preprocess for estimating the illumination light using the image sensor may execute a shading correction that corrects shading generated in the optical system and by the sensor and a distortion correction that corrects the distortion in the optical system, the illumination light can be accurately estimated. When the expression (9) is used, the illumination light cannot be estimated from the multi-band image in the area other than the sky area. In that case, the masking process that masks the area other than the sky area in the image may be provided.

Images in the middle of FIG. 2 are made by visualizing a direct light component coefficient $a_0(i, j)$, a Rayleigh scattering component coefficient $a_1(i, j)$, and a Mie scattering coefficient $a_2(i, j)$. The values of $a_0(i, j)$, $a_1(i, j)$, and $a_2(i, j)$ can be calculated with the expression (14). The bottom in FIG. 2 visualizes the radiance B(i, j, k) in each point in the sky. Where k is a wavelength division number and $N_L$ is a wavelength number, $1 \leq k \leq N_L$ is satisfied. The radiance B(i, j, k) represents a spatial distribution of the radiance for the k-th wavelength $\lambda_k$. As discussed above, the spatial distribution information of the illumination light can be obtained based on the RGB images (illumination spectrum estimation).

Next, at the step S12, the information processing apparatus calculates the object illumination light $E_i(\lambda)$ for illuminating the object, based on the spatial distribution information of the illumination light estimated at the step S11 and the surface normal information of the object (orientation information of the object).

Figure 3A:
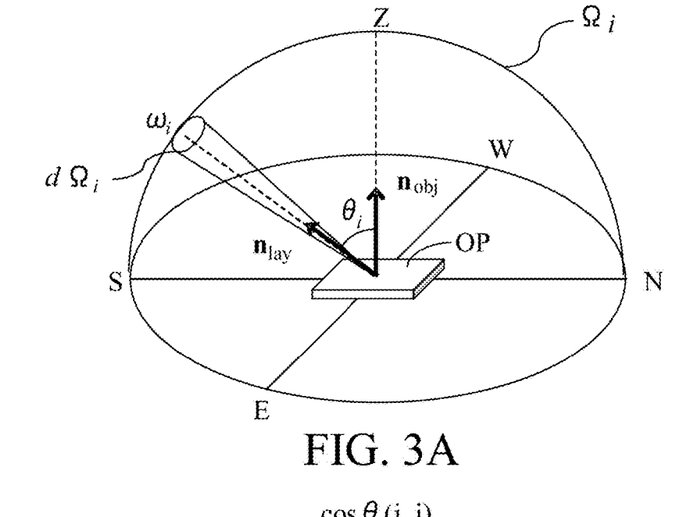
FIGS. 3A to 3D are explanatory views of a calculating method of object illumination light according to the first embodiment.
Figure 8:
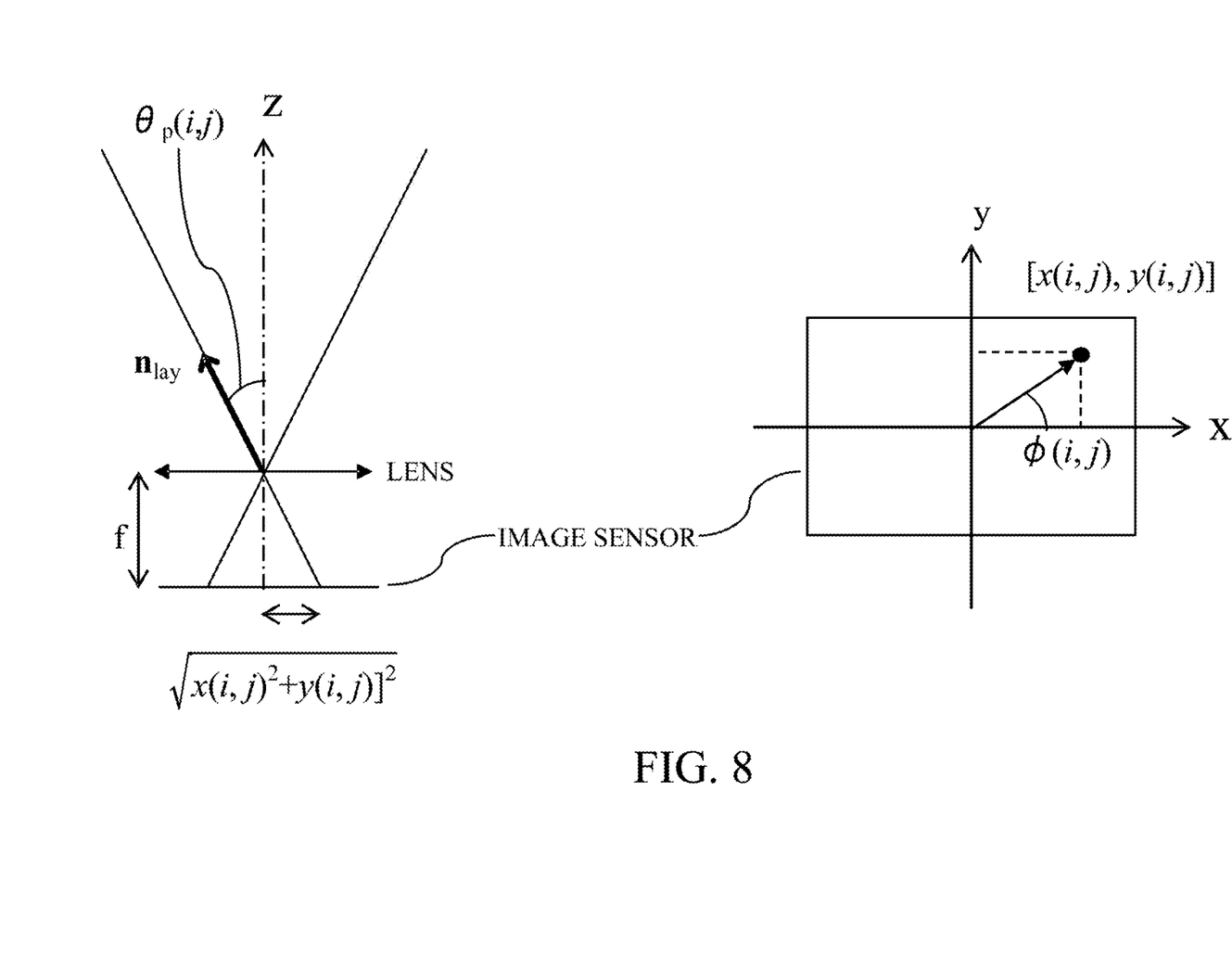
FIG. 8 is an explanatory view of a calculating method of a unit vector of a light ray according to each embodiment.

FIG. 3A illustrates an arrangement of the object under the illumination light. In FIG. 3A, N, E, S, and W represent directions (north, east, south, and west), and the object reflection surface OP directs the right above. Herein, $n_{obj}$ represents a surface normal vector of the object reflection surface OP. In addition, $n_{lay}$ represents a unit vector of a light ray entering the object reflection surface OP from the direction with an angle $\omega_i$, and the orientation is defined opposite to the light traveling direction. The unit vector $n_{lay}$ can be calculated using a projection method of the image. This embodiment uses the image captured with the optical system of the equisolid angle projection. In this case, the unit vector $n_{lay}$ can be expressed by the following expressions (15) to (17) with a relationship illustrated in FIG. 8.

$$\theta_p(i,j)=2\sin^{-1}\{\sqrt{x(i,j)^2+y(i,j)^2}/(2f)\} \quad (15)$$

$$\phi(i,j)=\tan^{-1}\{y(i,j)/x(i,j)\} \quad (16)$$

$$n_{lay}(i,j)=[\sin\theta_p(i,j)\cos\phi(i,j), \sin\theta_p(i,j)\sin\phi(i,j), \cos\theta_p(i,j)] \quad (17)$$

In the expressions (15) to (17), f is a focal length of the optical system, x(i, j) and y(i, j) are distances in the x direction and in the y direction on the image sensor at the pixel (x, y).

Figure 3B:
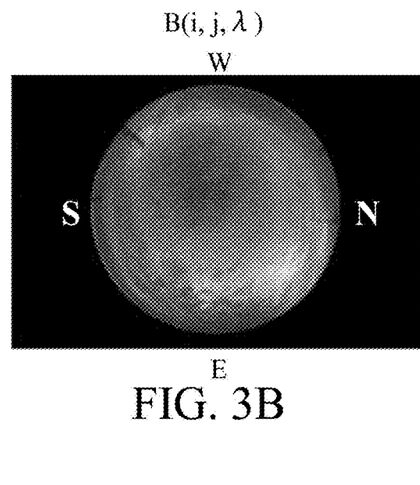
Figure 3C:
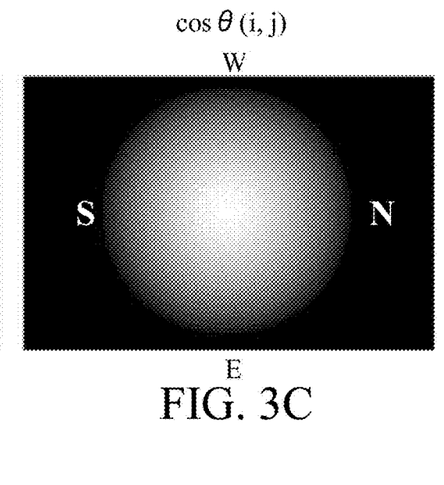
Figure 3D:
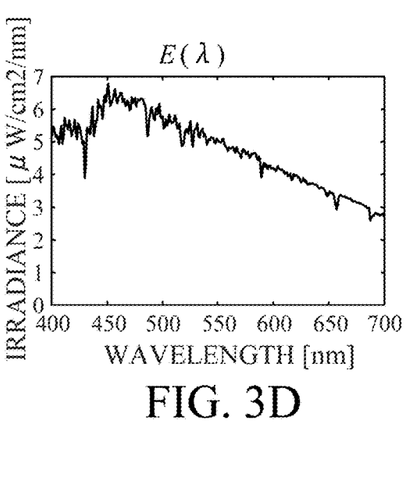

FIG. 3B visualizes the radiance B(i, j, k) of the k-th wavelength $\lambda_k$ that reaches the object from the infinitesimal solid angle $d\Omega_i$ from the direction with the angle $\omega_i$. FIG. 3C visualizes the cos θ distribution in the expression (1). cos θ(i, j) can be calculated based on an inner product between the surface normal vector $n_{obj}$ and the unit vector $n_{lay}$. FIG. 3D illustrates the object illumination light $E_i(\lambda)$ calculated with FIGS. 3B and 3C based on the expression (1). In FIG. 3D, the abscissa axis denotes the wavelength, and the ordinate axis denotes the radiance. When the projection method of the optical system is an equisolid angle projection, a solid angle corresponding to each pixel in the image is equal and thus the infinitesimal solid angle $d\Omega_i$ can be made constant and facilitates the integration. This configuration can accurately calculate the object illumination light in image pickup.

Finally, at the step S13, the information processing apparatus corrects information on the reflected light measured under the illumination light (data obtained by the camera) so as to reduce the influence of the illumination light of the object. More specifically, the information processing apparatus corrects the information on the reflected light based on the object illumination light calculated at the step S12 (information on the object illumination light), the reflected light from the object measured under the illumination light (information on the reflected light), and the orientation information of the reflected light. The information processing apparatus corrects the information on the reflected light and calculates the reflectance characteristic of the object, for example, as expressed by the expression (4).

Second Embodiment

Referring now to FIGS. 4A to 4D, a description will be given of an information processing method according to a second embodiment of the present invention. FIGS. 4A to 4D explain the step S12 (calculation of the object illumination light) in FIG. 1. The information processing method according to this embodiment in which the surface normal vector $n_{obj}$ of the object reflection surface OP faces a direction of S (south) is different from that in the first embodiment in which the surface normal vector $n_{obj}$ faces the right above. Otherwise, the information processing method of this embodiment is similar to the first embodiment described with reference to FIG. 1, and a description thereof will be omitted.

Figure 4A:
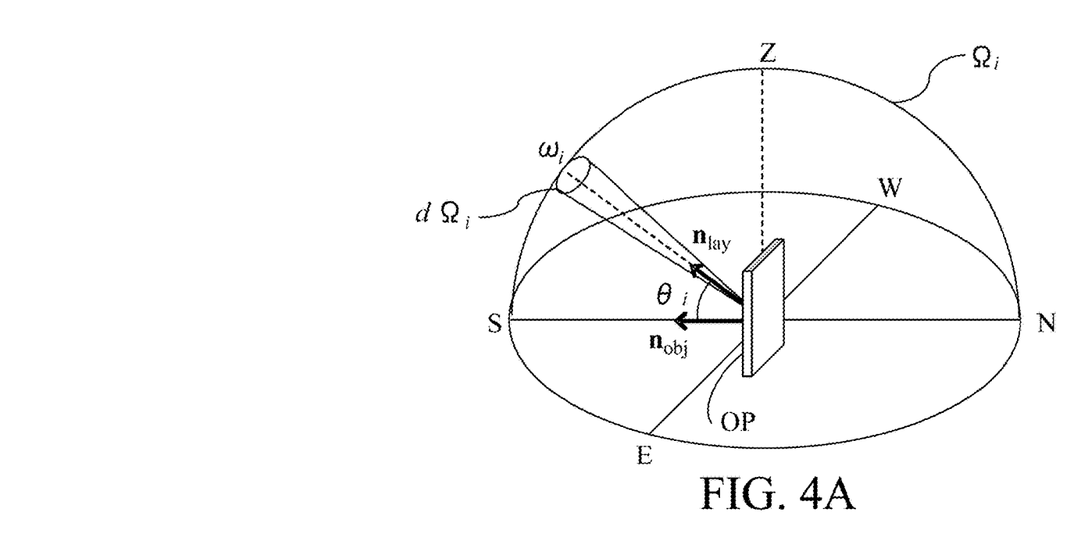
FIGS. 4A to 4D are explanatory views of a calculating method of object illumination light according to a second embodiment.
Figure 4B:
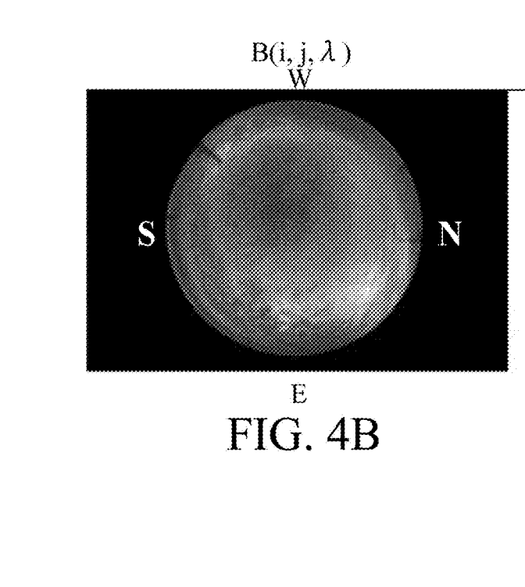
Figure 4C:
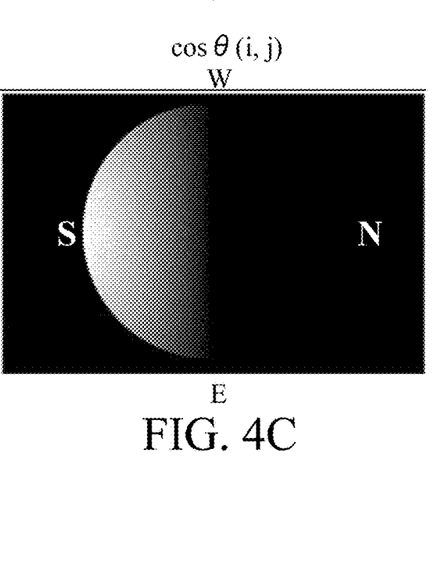
Figure 4D:
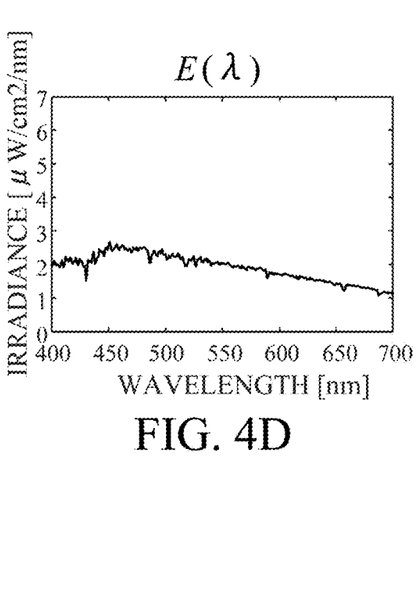

FIG. 4A illustrates an arrangement of the object under the illumination light. In FIG. 4A, the object reflection surface OP faces the just beside (direction of S(south)). FIG. 4B visualizes the radiance B(i, j, k) of the k-th wavelength $\lambda_k$ that reaches the object from the infinitesimal solid angle $d\Omega_i$ in the direction with the angle $\omega_i$ and has the same value as that in FIG. 3D. FIG. 4C visualizes the cos θ distribution in the expression (1). As illustrated in FIG. 4C, the surface normal vector of the object reflection surface is different, and thus has a distribution from that in the first embodiment. FIG. 4D illustrates the object illumination light $E_i(\lambda)$ calculated using FIGS. 4B and 4C based on the expression (1).

As described above, this embodiment previously has the spatial distribution information of the illumination light, and thus the object illumination light can be accurately calculated in accordance with the object orientation.

Third Embodiment

Figure 5:
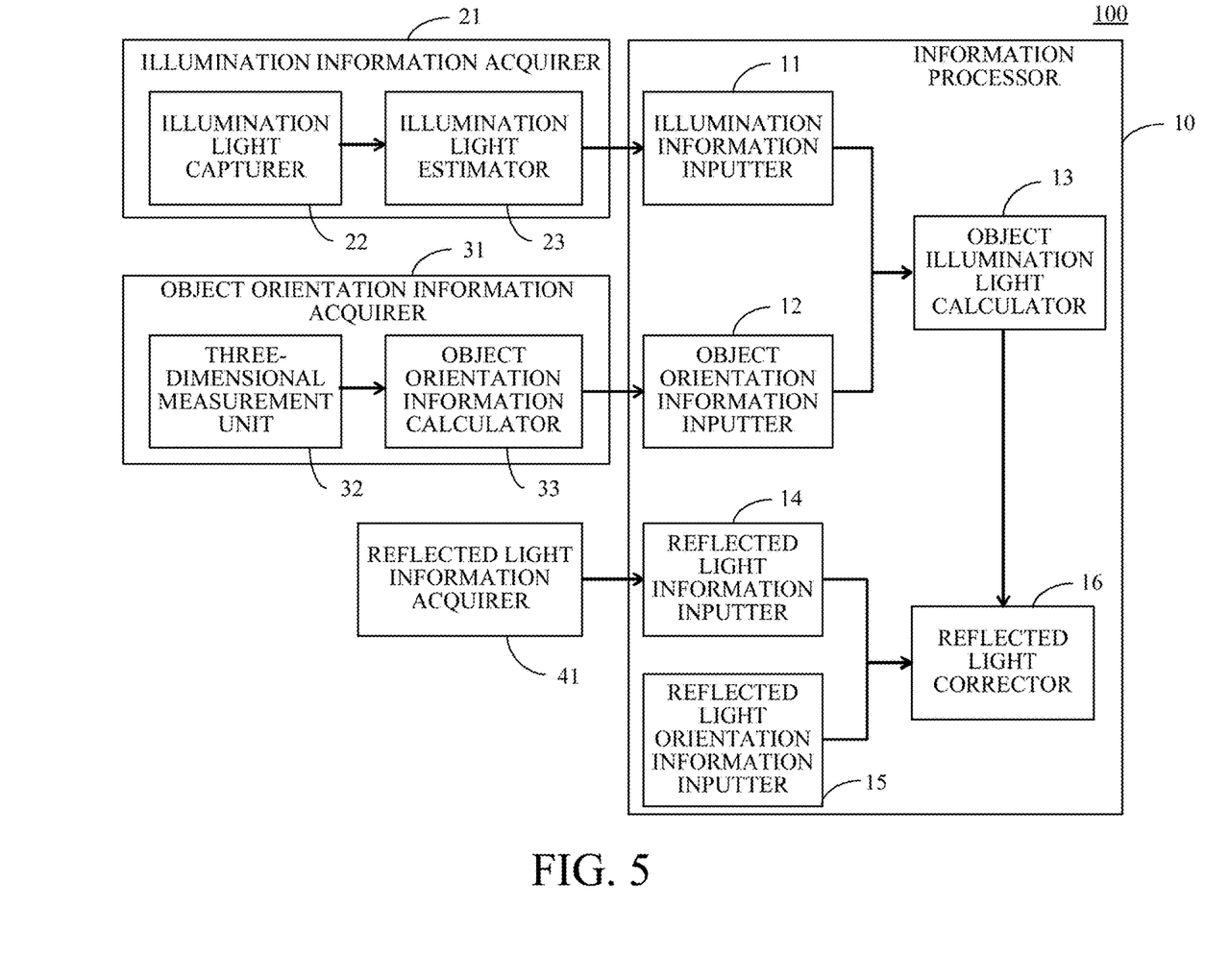
FIG. 5 is a block diagram of an information processing apparatus according to a third embodiment.

Referring now to FIG. 5, a description will be given of an information processing apparatus (measurement system) according to a third embodiment of the present invention. FIG. 5 is a block diagram of the information processing apparatus 100. The information processing apparatus 100 includes an information processor 10, an illumination information acquirer 21, an object orientation information acquirer 31, and a reflected light information acquirer 41.

The information processor 10 executes, for example, the information processing method according to the first and second embodiments. The information processor 10 includes an illumination information inputter (first inputter) 11, an object orientation information inputter (second inputter) 12, an object illumination light calculator 13, a reflected light information inputter (third inputter) 14, a reflected light orientation information inputter (fourth inputter) 15, and a reflected light corrector 16. The illumination information acquirer (first acquirer) 21 includes an illumination light capturer 22 and an illumination light estimator 23. The object orientation information acquirer (second acquirer) 31 includes a three-dimensional measurement unit 32 and an object orientation information calculator 33.

The illumination light capturer (image capturer) 22 captures a hemispherical image in the sky. The illumination light estimator 23 estimates the illumination light (spatial distribution information of the illumination light) using an image captured by the illumination light capturer 22, such as image data captured with a fisheye lens. The spatial distribution information of the estimated illumination light is input into the illumination information inputter 11. The three-dimensional measurement unit (measurement unit) 32 measures three-dimensional information of the object. The object orientation information calculator (second calculator) 33 calculates surface normal information (surface normal vector $n_{obj}$) as orientation information of the object based on the three-dimensional information (three-dimensional measurement information) measured by the three-dimensional measurement unit 32. The surface normal information of the object calculated by the object orientation information calculator 33 is input into the object orientation information inputter 12. The object illumination light calculator (first calculator) 13 calculates the object illumination light $E_i(\lambda)$ using the spatial distribution information of the illumination light input into the illumination information inputter 11 and the surface normal information of the object input into the object orientation information inputter 12 and based on the expression (1), for example.

The reflected light information acquirer (third acquirer) 41 is, for example, a camera, and obtains information on the reflected light from the object under the illumination light used to capture the hemispherical image (data obtained by the camera). The information on the reflected light from the object acquired by the reflected light information acquirer 41 is input into the reflected light information inputter 14. The orientation information of the reflected light is input into the reflected light orientation information inputter 15. The orientation information of the reflected light contains information on an angle $\theta_r$ between the center axis of the reflected light from the object and the surface normal of the object. This embodiment acquires the orientation information of the reflected light based on the information from the angular sensor attached to the reflected light information acquirer 41.

The reflected light corrector 16 corrects information on the reflected light from the object based, for example, on the expressions (4) and (6). In other words, the reflected light corrector 16 corrects the information on the reflected light based on the information on the object illumination light calculated by the object illumination light calculator 13, the information on the reflected light from the object input into the reflected light information inputter 14, and the orientation information of the reflected light input into the reflected light orientation information inputter 15. The reflected light corrector 16 corrects information on the reflected light of the object using the expressions (7) and (8) based on the information on the object illumination light calculated by the object illumination light calculator 13, and the information on the reflected light from the object input into the reflected light information inputter 14. The information on the reflected light corrected by the reflected light corrector 16 (information on the corrected reflected light) is, for example, output to an external apparatus, and stored in a storage or memory in the information processing apparatus 100 or displayed on a display unit.

Fourth Embodiment

Figure 6:
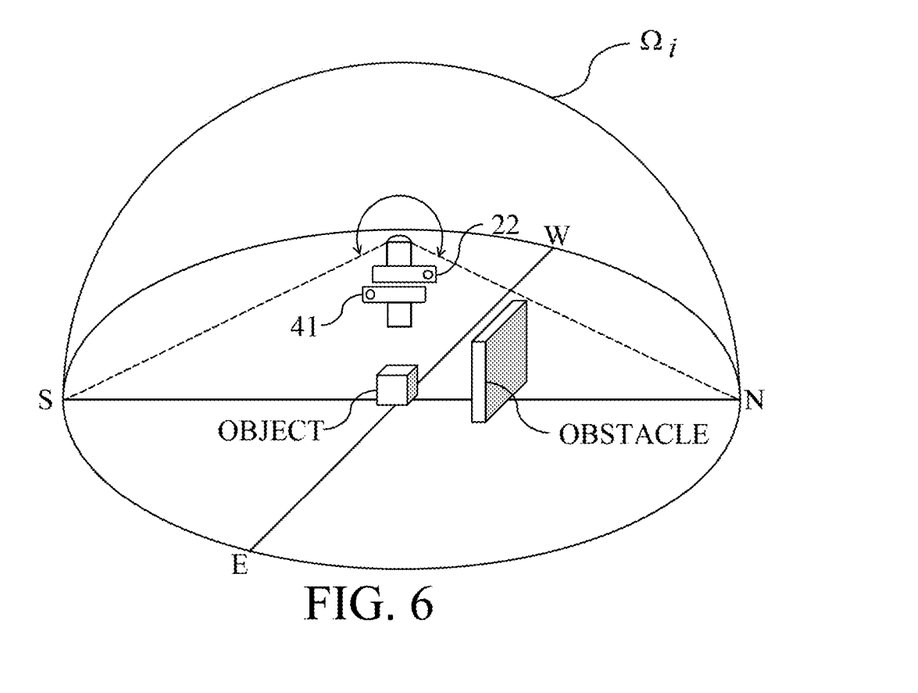
FIG. 6 is a configuration diagram of an information processing apparatus according to a fourth embodiment.

Referring now to FIG. 6, a description will be given of an information processing apparatus (measurement system) according to this embodiment. The information processing apparatus according to this embodiment includes a configuration similar to that of the information processing apparatus 100 according to the third embodiment described with reference to FIG. 5. FIG. 6 illustrates the illumination light capturer 22 and the reflected light information acquirer 41. The illumination light capturer 22 includes a whole circumference fisheye lens (optical system) that has a whole angle of view $2\theta_p$ of 180 degrees or higher for all azimuths. Hence, the information processing apparatus according to this embodiment can capture an image at a higher position in an image pickup environment even with a surrounding obstacle and acquire illumination information of the entire sky.

Each of the illumination light capturer 22 and the reflected light information acquirer 41 according to this embodiment includes a multi-band camera having RGB or three bands with a common spectral sensitivity characteristic. Each optical system is set so that the spectral transmittance L(A) of the optical system in the illumination light capturer 22 and the spectral transmittance L(A) of the optical system in the reflected light information acquirer 41 can be equal to each other. Thus, in calculating the reflection characteristic in which the influence of the object illumination light is reduced or removed from the reflected light from the object using the information processing apparatus according to this embodiment, the expression (5) is equivalent with the RGB values obtained in the reflection light information acquirer 41. The value of the denominator on the right side in the expression (6) is equal to the value made by replacing B(i, j) in the expression (1) with the values of R(i, j), G(i, j), and B(i, j) obtained in the illumination light capturer 22.

Therefore, when the illumination light capturer 22 and the reflected light information acquirer 41 have the same spectral transmittance of the optical system and the same spectral sensitivity characteristic of the multi-band camera, the reflection characteristic can be calculated in which the influence of the object illumination light is reduced or removed without the illumination estimation processing. In addition, in this case, without using the approximation model expressed in the expression (9), the object illumination light is calculated using the actually measured values and advantageously the object illumination light can be more accurately calculated. Since the approximation model expressed in the expression (9) is not used, the influence of the illumination light entering the object from the area other than the sky area can be considered. For example, the illumination light reflected on the structure can be precisely expressed by the integrated value of the multi-band image in the structure area. In this case, the masking processing illustrated in FIG. 2 becomes unnecessary. While this embodiment provides one reflected light information acquirer 41 for one illumination light capturer 22, a plurality of reflected light information acquirers 41 may share one illumination light capturer 22, because the multi-band image of the sky captured in the illumination light capturer 22 is approximately the same in close areas.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each embodiment can accurately estimate the illumination light and correct the influence of the illumination light based on the reflected light from the object, irrespective of an insolation condition, the weather, and an object orientation. As a consequence, each embodiment can provide an information processing method and an information processing apparatus, which can accurately acquire a characteristic of an object.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-047327, filed on Mar. 13, 2017, which is hereby incorporated by reference herein in its entirety.

What is claimed is:

1. An information processing method comprising the steps of:
   acquiring information on illuminance on an object surface based on information on a spatial distribution of radiance of illumination light and information on an orientation of the object surface;
   acquiring information on light that has been reflected on the object surface while the object surface is illuminated with the illumination light; and
   correcting the acquired information on the light that has been reflected on the object surface so that influence of the illumination light is reduced, based on the information on the illuminance,
   wherein the step of correcting the acquired information on the light that has been reflected on the object surface includes the step of converting the acquired information on the light that has been reflected on the object surface in a space where the illumination light is distributed into information on reflected light which is reflected on the object surface in a space where other illumination light is distributed.

2. The information processing method according to claim 1, wherein the step of correcting the acquired information on the light that has been reflected on the object surface includes the step of acquiring a reflection characteristic of the object surface based on the information on the illuminance, the acquired information on the light that has been reflected on the object surface, and information on an orientation of the light that has been reflected on the object surface.

3. The information processing method according to claim 2, wherein the information on the orientation of the light that has been reflected on the object surface includes information on a unit vector of the light that has been reflected on the object surface based on the information on the orientation of the object surface.

4. The information processing method according to claim 1, wherein when a plurality of local objects is considered to be one object, the information on the orientation of the object surface contains information on an orientation of a surface of the one object.

5. The information processing method according to claim 1, wherein the information on the orientation of the object surface is obtained by averaging information on orientations of local surfaces of an object.

6. The information processing method according to claim 1, further comprising the step of acquiring the information on the spatial distribution by using an image including at least three wavelength bands.

7. The information processing method according to claim 6, wherein the image is an image acquired by using an image capturer which has an angle of view of 180 degrees or higher for all azimuths.

8. The information processing method according to claim 1, further comprising the step of acquiring the information on the orientation of the object surface based on three-dimensional measurement information of an object.

9. A computer-readable non-transitory storage medium storing a program that enables a computer to execute the information processing method according to claim 1.

10. An information processing method comprising the steps of:
- acquiring information on illuminance on an object surface based on information on a spatial distribution of radiance of illumination light and information on an orientation of the object surface;
- acquiring information on light that has been reflected on the object surface while the object surface is illuminated with the illumination light; and
- correcting the acquired information on the light that has been reflected on the object surface so that influence of the illumination light is reduced, based on the information on the illuminance,
- wherein the information on the orientation of the object surface contains one of a surface normal vector of the object surface, an azimuth angle and an elevation angle of the object surface, and slopes of the object surface in directions.

11. An information processing apparatus comprising:
- an illumination information inputter configured to input information on a spatial distribution of radiance of illumination light;
- an object orientation information inputter configured to input information on an orientation of an object surface;
- an object illumination light calculator configured to acquire information on illuminance on the object surface based on the information on the spatial distribution of the radiance of the illumination light and the information on the orientation of the object surface;
- a reflected light information inputter configured to input information on light that has been reflected on the object surface while the object surface is illuminated with the illumination light; and
- a reflected light corrector configured to correct the input information on the light that has been reflected on the object surface so that influence of the illumination light is reduced, based on the information on the illuminance,
- wherein the reflected light corrector converts the input information on the light that has been reflected on the object surface in a space where the illumination light is distributed into information on reflected light which is reflected on the object surface in a space where other illumination light is distributed.

12. The information processing apparatus according to claim 11, further comprising a reflected light orientation information inputter configured to input information on an orientation of the light that has been reflected on the object surface,
- wherein the reflected light corrector corrects the input information on the light that has been reflected on the object surface based on the information on the illuminance, the input information on the light that has been reflected on the object surface, and the information on the orientation of the light that has been reflected on the object surface.

13. The information processing apparatus according to claim 11, further comprising an illumination information acquirer configured to acquire the information on the spatial distribution of the radiance of the illumination light,
- wherein the illumination information inputter inputs the information on the spatial distribution of the radiance of the illumination light acquired by the illumination information acquirer.

14. The information processing apparatus according to claim 13, wherein the illumination information acquirer includes:
- an illumination light capturer configured to acquire an image including at least three wavelength bands; and
- an illumination light estimator configured to estimate the illumination light based on the image.

15. The image processing apparatus according to claim 14, wherein the illumination light capturer includes an image capturer that has an angle of view of 180 degrees or higher for all azimuths.

16. The image processing apparatus according to claim 15, wherein the image capturer includes an optical system of an equisolid angle projection.

17. The image processing apparatus according to claim 11, further comprising an object orientation information acquirer configured to acquire the information on the orientation of the object surface,
- wherein the object orientation information inputter inputs the information on the orientation of the object surface acquired by the object orientation information acquirer.

18. The information processing apparatus according to claim 17, wherein the object orientation information acquirer includes:
- a three-dimensional measurement unit configured to three-dimensionally measure an object; and
- an object orientation information calculator configured to calculate the information on the orientation of the object surface based on the three-dimensional measurement information output from the three-dimensional measurement unit.

19. The information processing apparatus according to claim 11, further comprising a reflected light information acquirer configured to acquire the information on the light that has been reflected on the object surface,
- wherein the reflected light information inputter inputs the information on the light that has been reflected on the object surface acquired by the reflected light information acquirer.

* * * * *